United States Patent
Bae

(10) Patent No.: US 10,341,704 B2
(45) Date of Patent: *Jul. 2, 2019

(54) MULTICAST-BASED CONTENT TRANSMITTING SYSTEM AND METHOD, AND DEVICE AND METHOD FOR ESTIMATING HIGH-SPEED MOVEMENT

(71) Applicant: SK PLANET CO., LTD., Seongnam-si, Gyeonggi-do (KR)

(72) Inventor: Tae Meon Bae, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/673,034

(22) Filed: Aug. 9, 2017

(65) Prior Publication Data

US 2017/0339445 A1 Nov. 23, 2017

Related U.S. Application Data

(63) Continuation of application No. 14/131,068, filed as application No. PCT/KR2012/003410 on May 2, 2012, now Pat. No. 9,769,511.

(30) Foreign Application Priority Data

| Jul. 6, 2011 | (KR) | 10-2011-0066753 |
| Jul. 6, 2011 | (KR) | 10-2011-0066754 |
| Jul. 22, 2011 | (KR) | 10-2011-0072892 |

(51) Int. Cl.
*H04N 21/262* (2011.01)
*H04N 21/438* (2011.01)
(Continued)

(52) U.S. Cl.
CPC ....... *H04N 21/26275* (2013.01); *G06T 7/223* (2017.01); *H04L 12/185* (2013.01);
(Continued)

(58) Field of Classification Search
None
See application file for complete search history.

(56) References Cited

U.S. PATENT DOCUMENTS

| 5,973,741 A | 10/1999 | Takashima et al. |
| 6,256,673 B1 | 7/2001 | Gayman |
| | (Continued) | |

FOREIGN PATENT DOCUMENTS

| CN | 101523908 A | 9/2009 |
| CN | 101946460 A | 1/2011 |
| | (Continued) | |

OTHER PUBLICATIONS

Viet-Anh Nguyen et al: "Efficient block-matching motion estimation based on Integral frame attributes", IEEE Transactions on Circuits and Systems for Video Technology, vol. 16, No. 3, Dated Mar. 1, 2006, pp. 375-385.

(Continued)

*Primary Examiner* — Fernando Alcon
(74) *Attorney, Agent, or Firm* — Brinks Gilson & Lione

(57) ABSTRACT

The present invention relates to a multicast-based content transmitting system and method, and a device and method for estimating high-speed movement. Included are: a content providing device for generating N×M multicast stream channels having different transmission start times and transmission rates, providing N×M multicast stream channel lists, and transmitting content through one channel of N×M multicast stream channels; and a user terminal for selecting one channel of the N×M multicast stream channel lists provided from the content providing device and receiving content through the selected multicast stream channel.

10 Claims, 10 Drawing Sheets

(51) Int. Cl.

| | |
|---|---|
| *H04N 21/442* | (2011.01) |
| *H04N 21/647* | (2011.01) |
| *H04N 21/658* | (2011.01) |
| *H04N 21/2343* | (2011.01) |
| *H04N 21/6405* | (2011.01) |
| *H04L 29/06* | (2006.01) |
| *H04N 19/533* | (2014.01) |
| *H04L 12/18* | (2006.01) |
| *H04N 19/176* | (2014.01) |
| *H04N 19/182* | (2014.01) |
| *H04N 19/517* | (2014.01) |
| *G06T 7/223* | (2017.01) |
| *H04N 19/51* | (2014.01) |
| *H04N 19/513* | (2014.01) |
| *H04N 19/89* | (2014.01) |

(52) U.S. Cl.
CPC ....... *H04L 65/4076* (2013.01); *H04N 19/176* (2014.11); *H04N 19/182* (2014.11); *H04N 19/51* (2014.11); *H04N 19/513* (2014.11); *H04N 19/517* (2014.11); *H04N 19/533* (2014.11); *H04N 19/89* (2014.11); *H04N 21/23439* (2013.01); *H04N 21/4382* (2013.01); *H04N 21/44209* (2013.01); *H04N 21/6405* (2013.01); *H04N 21/64776* (2013.01); *H04N 21/6581* (2013.01); *G06T 2207/10016* (2013.01)

(56) References Cited

U.S. PATENT DOCUMENTS

| | | |
|---|---|---|
| 6,289,054 B1 | 9/2001 | Rhee |
| 6,665,872 B1 | 12/2003 | Krishnamurthy et al. |
| 8,693,544 B2 | 4/2014 | Lee |
| 2002/0124258 A1 | 9/2002 | Fritsch |
| 2003/0126238 A1* | 7/2003 | Kohno .................. H04L 1/0009 709/220 |
| 2004/0172478 A1 | 9/2004 | Jacobs et al. |
| 2005/0172028 A1 | 8/2005 | Nilsson et al. |
| 2007/0211665 A1 | 9/2007 | Yoshida et al. |
| 2007/0233889 A1 | 10/2007 | Guo et al. |
| 2008/0024663 A1 | 1/2008 | Sakurada |
| 2009/0064242 A1 | 3/2009 | Cohen et al. |
| 2009/0249133 A1 | 10/2009 | Pons et al. |
| 2009/0262838 A1 | 10/2009 | Gholmieh et al. |
| 2009/0282312 A1 | 11/2009 | Liu |
| 2009/0300459 A1 | 12/2009 | Fukuoka |
| 2010/0020823 A1 | 1/2010 | Bai et al. |
| 2010/0036964 A1 | 2/2010 | Cedervall et al. |
| 2010/0131992 A1 | 5/2010 | Kenmotsu et al. |
| 2010/0166072 A1 | 7/2010 | Bukin |
| 2010/0229211 A1 | 9/2010 | Lee et al. |
| 2010/0333160 A1 | 12/2010 | Flinta et al. |
| 2011/0185248 A1 | 7/2011 | Linskey et al. |
| 2011/0261146 A1 | 10/2011 | Kamath et al. |
| 2012/0198506 A1 | 8/2012 | Joe et al. |
| 2013/0111060 A1 | 5/2013 | Nilsson et al. |

FOREIGN PATENT DOCUMENTS

| | | |
|---|---|---|
| KR | 1020040049214 A | 6/2004 |
| KR | 100648596 B1 | 11/2006 |
| KR | 10-2007-0070064 A | 7/2007 |
| KR | 10-2010-0096872 A | 9/2010 |
| KR | 10-2011-0007212 A | 1/2011 |
| KR | 10-2011-0048243 A | 5/2011 |

OTHER PUBLICATIONS

European Office Action for European Application No. 16204373.11208, dated Feb. 14, 2018, 9 pages.
International Search Report dated Nov. 23, 2012 for PCT/KR2012/003410.
Hong-Ik Kim et al.: "A Hybrid Video-on-Demand Data Broadcasting and Receiving Scheme of Harmonic and Staggered Schemes", IEEE Transactions on Broadcasting, IEEE Service Center, Dec. 1, 2008, pp. 771-778, vol. 54, No. 4.
European Search Report for Application No. 12 806 939.0 dated Feb. 4, 2016.
Mei-Juan Chen et al., Fast Multiframe Motion Estimation Algorithms by Motion Vector Composition for the MPEG-4/AVC/H.264 Standard, IEEE Transactions on Multimedia, Jun. 1, 2006, pp. 478-481, XP002559726.
Mingquan Wu et al., IPTV Multicast Over Wireless LAN Using Merged Hybrid ARQ With Staggered Adaptive FEC, IEEE Transactions on Broadcasting, Jun. 1, 2009, pp. 363-374, XP011343482.
Sina Farsiu et al., Constrained, globally, optimal, multi-frame motion estimation, Statistical Signal Processing, Jul. 17, 2005, pp. 1396-1401, XP032437344.
European Search Report in connection with the counterpart European Patent Application No. 12806939.0 dated Mar. 20, 2015.
Mingquan Wu et al.,"IPTV Multicast Over Wireless LAN Using Merged Hybrid ARQ With Staggered Adaptive FEC", IEEE Transactions on Broadcasting, Jun. 2009, pp. 363-374, vol. 55, No. 2.
European Search Report for application No. 12806939.0 dated Jan. 9, 2015.

* cited by examiner (a)

(b)

MULTICAST-BASED CONTENT TRANSMITTING SYSTEM AND METHOD, AND DEVICE AND METHOD FOR ESTIMATING HIGH-SPEED MOVEMENT

CROSS REFERENCE TO RELATED APPLICATION

This is a Continuation Application of a U.S. patent application Ser. No. 14/131,068, filed on Jan. 6, 2014 which is a National Phase of PCT/KR2012/003410, filed May 2, 2012, which is based on and claims priority of Korean Patent Application No. 10-2011-0066753 filed on Jul. 6, 2011, Korean Patent Application No. 10-2011-0066754 filed on Jul. 6, 2011 and Korean Patent Application No. 10-2011-0072892 filed on Jul. 22, 2011 in the Korean Intellectual Property Office. The disclosures of the above-listed application are hereby incorporated herein by reference in their entirety.

TECHNICAL FIELD

The present invention relates to a multicast-based contents transmission system and method, and more specifically, to a multicast-based contents transmission system and method for multicasting large-volume contents to a plurality of terminals in a short period of time considering network use cost, retransmitting contents which generate an error if a transmission error occurs, and adaptively transmitting the contents considering user's network environment.

In addition, the present invention relates to an apparatus and method for estimating a motion at a high speed, and more specifically, to an apparatus and method for estimating a motion at a high speed, which can reduce operation quantity required for estimating the motion through block matching using an n-th momentum of an image and encode the image at a high speed.

BACKGROUND ART

With the advancement in network environments, service providers begin to release a service of pushing contents to a user.

Particularly, the service providers actively plan to provide a service of previously pushing (downloading) multimedia contents into a mobile terminal of a user subscribing the service and allow the user to play back the previously downloaded contents even in an offline state or in a situation difficult to receive a streaming service.

A technique of minimizing network use cost is required to provide a service of downloading multimedia contents of a large volume, and a method utilizing a content delivery network (CDN) is widely used.

The CDN is a system for installing a plurality of cache servers (temporary storage devices) under the network of an Internet service provider (ISP), moving contents provided by a contents provider (CP) in advance, and downloading the contents in response to a demand of a user, which is a technique capable of improving transmission speed and preventing degradation of speed and loss of data that can be generated in the middle of transmitting data by moving the contents to a location near the user in advance through the CDN.

It is required to develop a contents transmission technique capable of safely and speedily processing traffic which is concentrated when multimedia contents of a large volume are transmitted.

In addition to this, a technique of encoding multimedia contents which will be transmitted is required in order to safely transmit the contents to a user terminal. Particularly, standardized image compression techniques such as Moving Picture Experts Group 2 (MPEG-2), MPEG-4, H.264 and the like are generally used.

An image compression method based on block matching among the standardized image compression techniques is a compression method which removes temporal redundancy between blocks using a motion estimation method.

The block matching is a process of dividing each frame of an image into blocks and searching for a block matching to a block of a currently encoded/decoded frame from previous frames or previously encoded/decoded frames, and the image compression method based on block matching is a method of compressing and transmitting an image using a difference between the matching blocks searched through the block matching.

Particularly, a method of searching for a matching block based on motion estimation may estimate a region in which an error value between the current block and the previous block, such as Sum of Absolute Difference (SAD) or Sum of Square Difference (SSD), is minimized as a block matching to the current block, and may calculate a difference between coordinates of matching blocks as a motion vector and use the difference in image compression.

In order to determine block matching based on the motion estimation, the SAD or the SSD needs to be calculated for all pixels in a motion search region.

For example, if a block size is N×N pixels and a motion search region is 32×32, 1024*(2N×N−1) times of addition/subtraction operations are required, and if the image size about 100N×80N, 8192000*(2N×N−1)*(N×N) times of operations are required.

The quantity of operation used for such block matching is as large as to occupy 50% of the quantity of operation used for encoding in maximum, and thus system load is induced, and processing speed is delayed.

That is, it needs to develop a contents transmission technique capable of safely and speedily processing traffic concentrated when large-volume multimedia contents are transmitted and a block matching technique capable of reducing the operation quantity.

DISCLOSURE OF INVENTION

Technical Problem

Therefore, the present invention has been made in view of the above problems, and it is an object of the present invention to provide a multicast-based contents transmission system and method for multicasting large-volume contents to a plurality of terminals in a short period of time considering network use cost, retransmitting the contents if a transmission error occurs, and adaptively transmitting the contents considering user's network environment.

Another object of the present invention is to provide an apparatus and method for estimating a motion at a high speed, which can reduce operation quantity required for estimating the motion through block matching using an n-th momentum of an image and encode the image at a high speed.

Technical Solution

To accomplish the above objects, according to one aspect of the present invention, there is provided a multicast-based contents transmission system including: a contents providing apparatus for creating N×M multicast stream channels respectively having a different transmission start time and a different transmission rate, providing an N×M multicast stream channel list, and transmitting contents through a channel among the N×M multicast stream channels; and a user terminal for selecting a channel from the N×M multicast stream channel list provided by the content providing apparatus and receiving the content through the selected multicast stream channel.

According to another aspect of the present invention, there is provided a contents providing apparatus including: a channel creation unit for creating N×M multicast stream channels; a channel list creation unit for creating an N×M multicast stream channel list including information on the N×M multicast stream channels; and a communication unit for providing the N×M multicast stream channel list created by the channel list creation unit and transmitting contents through a channel among the N×M multicast stream channels created by the channel creation unit.

The channel creation unit creates the N×M multicast stream channels configured of N multicast stream channels having transmission start times arranged at time intervals of T and M multicast stream channels of different transmission rates configured in each of the N multicast stream channels.

Here, the N×M multicast stream channel information includes information on contents to be transmitted, a transmission start time and a transmission rate of each channel.

In addition, the contents providing apparatus may further include a channel preparation unit for creating the contents to be transmitted on the N×M multicast stream channels in the form of a packet.

According to still another aspect of the present invention, there is provided a user terminal including: a communication unit for receiving an N×M multicast stream channel list, transmitting a channel selection signal for selecting a multicast stream channel from the N×M multicast stream channel list, and receiving contents through a multicast stream channel corresponding to the channel selection signal; and a channel selection unit for confirming an available transmission rate of a network and selecting an available multicast stream channel from the N×M multicast stream channel list received from the communication unit using the available transmission rate and a contents transmission request time.

Here, the N×M multicast stream channel list includes multicast stream channel information configured of information on contents to be transmitted, a transmission start time and a transmission rate of each channel.

The channel selection unit selects a multicast stream channel having a transmission rate lower than the available transmission rate from the provided N×M multicast stream channel list as a candidate multicast stream channel, and selects a multicast stream channel having a transmission start time closest to the contents transmission request time in the N×M multicast stream channel list among the candidate multicast stream channels.

In addition, the user terminal further including a contents reception unit for storing the transmitted contents, wherein the contents reception unit restores and stores lost packets using a Forward Error Correction method if the number of lost packets is smaller than a reference value and requests retransmission of the contents after deleting packets of the transmitted contents if the number of lost packets exceeds the reference value.

If retransmission of the contents is requested, the channel selection unit selects a candidate multicast stream channel list by comparing an available transmission rate of the user terminal at the time of requesting retransmission of the contents with transmission rates of the N×M multicast stream channel list and select a multicast stream channel by comparing a contents retransmission request time with the transmission start time.

In addition, the channel selection unit selects a multicast stream channel having a transmission start time later than the contents transmission request time in the N×M multicast stream channel list from the provided N×M multicast stream channel list as a candidate multicast stream channel and selects a multicast stream channel having a transmission rate lower than the available transmission rate and highest among the candidate multicast stream channels.

According to still another aspect of the present invention, there is provided a multicast-based contents transmission method including the steps of: creating, by a contents providing apparatus, N×M multicast stream channels and an N×M multicast stream channel list including information on the multicast stream channels; transmitting, by the contents providing apparatus, the N×M multicast stream channel list to a user terminal; transmitting, by the user terminal, a channel selection signal for selecting a multicast stream channel for transmitting contents using the multicast stream channel information of the transmitted N×M multicast stream channel list to the contents providing apparatus; and transmitting, by the contents providing apparatus, the contents to the user terminal using a multicast stream channel corresponding to the channel selection signal.

According to still another aspect of the present invention, there is provided a multicast-based contents transmission method of a contents providing apparatus, the method including the steps of: (a) creating, by the contents providing apparatus, N×M multicast stream channels respectively having a different transmission start time and a different transmission rate; (b) creating and providing, by the contents providing apparatus, an N×M multicast stream channel list including information on the N×M multicast stream channels; and (c) receiving, by the contents providing apparatus, a channel selection signal and transmitting contents using a multicast stream channel corresponding to the channel selection signal.

Step (a) includes the steps of: (a-1) creating the N multicast stream channels having transmission start times arranged at time intervals of T; and (a-2) creating the N×M multicast stream channels by creating M multicast stream channels of different transmission rates configured in each of the N multicast stream channels.

According to still another aspect of the present invention, there is provided a multicast-based contents reception method of a user terminal, the method including the steps of: (a) receiving, by the user terminal, an N×M multicast stream channel list including information on multicast stream channels configured of contents information, a transmission start time and a transmission rate; (b) selecting, by the user terminal, a multicast stream channel by comparing the transmission start time, the transmission rate and the contents information of the transmitted N×M multicast stream channel list with an available transmission rate of a network measured by the user terminal, a contents transmission request time and information on contents to be received; (c) transmitting, by the user terminal, a channel selection signal for selecting the multicast stream channel; and (d) receiving, by the user terminal, contents using the selected multicast stream channel.

Step (b) includes the step of: (b-1) selecting a multicast stream channel having a transmission rate lower than the available transmission rate from the transmitted N×M multicast stream channel list as a candidate multicast stream channel; and (b-2) selecting a multicast stream channel having a transmission start time closest to the contents transmission request time in the N×M multicast stream channel list among the candidate multicast stream channels.

Step (b) includes the step of:

(b-1) selecting a multicast stream channel having a transmission start time later than the contents transmission request time in the N×M multicast stream channel list from the transmitted N×M multicast stream channel list as a candidate multicast stream channel; and (b-2) selecting a multicast stream channel having a highest transmission rate among the candidate multicast stream channels.

The multicast-based contents reception method of a user terminal further comprises, after step (d), the step of (e) comparing, by the user terminal, the number of lost packets of the transmitted contents with a reference value and restoring the lost packets using a Forward Error Correction method or requesting retransmission of the contents after deleting packets of the transmitted contents.

According to still another aspect of the present invention, there is provided a motion estimation apparatus including: an n-th image creation unit for creating an n-th compared image and an n-th reference image having a value obtained by multiplying a pixel value by n times as an n-th pixel value of a pixel for each pixel of the compared image and the reference image; an n-th integral image creation unit for creating an n-th integral compared image and an n-th integral reference image by calculating pixel values up to set pixel coordinates for the n-th compared image and the n-th reference image; an n-th momentum calculation unit for calculating an n-th momentum of the compared image and an n-th momentum of the reference image for a set block using the n-th integral compared image and the n-th integral reference image; and a motion vector estimation unit for calculating a block matching error using the n-th momentum of the compared image and the n-th momentum of the reference image and estimating a coordinate difference between a compared image block and a reference image block having a smallest block matching error as a motion vector.

The n-th image creation unit creates the n-th compared image and the n-th reference image using a following mathematical expression.

[Mathematical Expression]

$$O_n(x,y) = i(x,y) * O_{n-1}(x,y)$$

Here, i(x,y) expresses an original image of the compared image or the reference image, $O_n(x,y)$ expresses the n-th compared image or the n-th reference image, and (x,y) expresses the pixel coordinates.

The n-th integral image creation unit creates the n-th integral compared image and the n-th integral reference image using a following mathematical expression.

[Mathematical Expression]

$$I_n(X,Y) = \Sigma^Y \Sigma^X O_n(x,y)$$

Here, $I_n(x,y)$ expresses the n-th integral compared image or the n-th integral reference image, $O_n(x,y)$ expresses the n-th compared image or the n-th reference image, and (x,y) expresses the pixel coordinates.

The n-th momentum calculation unit calculates the n-th momentum of four blocks including a set block for the compared image and the reference image using a following mathematical expression.

[Mathematical Expression]

$$M_n = I_n(x_e, y_e) + I_n(x_e-1, y_e-1) [I_n(x_e-1, y_e) + I_n(x_e, y_e-1)]$$

Here, $I_n(x, y)$ expresses the n-th integral compared image or the n-th integral reference image of a pixel or a block ($x_e$, $y_e$), and ($x_e$, $y_e$), ($x_e-1$, $y_e-1$), ($x_e-1$, $y_e$) and ($x_e$, $y_e-1$) express the pixel coordinates or block coordinates.

The motion vector estimation unit calculates at least one of SAD and SSD as the block matching error using a following mathematical expression.

[Mathematical Expression]

$$SAD = [\Sigma \alpha_n |M_{n,ref} - M_{n,curr}|] \times \gamma$$

$$SSD = [\Sigma \beta_n |M_{n,ref} - M_{n,curr}|^2] \times \gamma$$

Here, $M_{n,ref}$ denotes the n-th momentum for the set block of the reference image, $M_{n,curr}$ denotes the n-th momentum for the set block of the compared image, $\alpha_n$ and $\beta_n$ denote weighting factors of the n-th momentums, and $\gamma$ denotes a constant.

According to still another aspect of the present invention, there is provided a image encoding apparatus for estimating a motion at a high speed, the apparatus including: a motion estimation unit for creating an n-th compared image and an n-th reference image for a compared image and a reference image, creating an n-th integral compared image and an n-th integral reference image by calculating pixel values up to set pixel coordinates for the n-th compared image and the n-th reference image, calculating an n-th momentum of the compared image and an n-th momentum of the reference image for a set block using the n-th integral compared image and the n-th integral reference image, calculating a block matching error using an n-th momentum difference, and estimating a coordinate difference between a compared image block and a reference image block having a smallest block matching error as a motion vector; a motion compensation unit for creating an estimated image for the compared image from the reference image using the estimated motion vector; a subtractor for creating a difference image of the compared image and the reference image; and an encoding unit for encoding the created difference image.

According to still another aspect of the present invention, there is provided a method of estimating a motion at a high speed, the method including the steps of: creating an n-th compared image and an n-th reference image having a value obtained by multiplying a pixel value by n times as an n-th pixel value of a pixel for each pixel of the compared image and the reference image; creating an n-th integral compared image and an n-th integral reference image by calculating pixel values up to set pixel coordinates for the n-th compared image and the n-th reference image; calculating an n-th momentum of the compared image and an n-th momentum of the reference image for a set block using the n-th integral compared image and the n-th integral reference image; calculating a block matching error using a difference between the n-th momentum of the compared image and the n-th momentum of the reference image; and estimating a coordinate difference between a compared image block and a reference image block having a smallest block matching error as a motion vector.

Advantageous Effects

According to the present invention, large-volume contents can be transmitted to a user while minimizing network load by downloading the large-volume contents through multicasting.

In addition, transmission error which occurs during multicasting can be solved through FEC, multi-stream transmission and repetitive transmission of streams, and an optimum multicast stream can be selected considering the network environment of a user.

In addition, it is possible to reduce operation quantity, improve operation speed, estimate a motion at a high speed, and reduce image encoding time when block matching is performed using an n-th block momentum.

DESCRIPTION OF SYMBOLS

Figure 1:
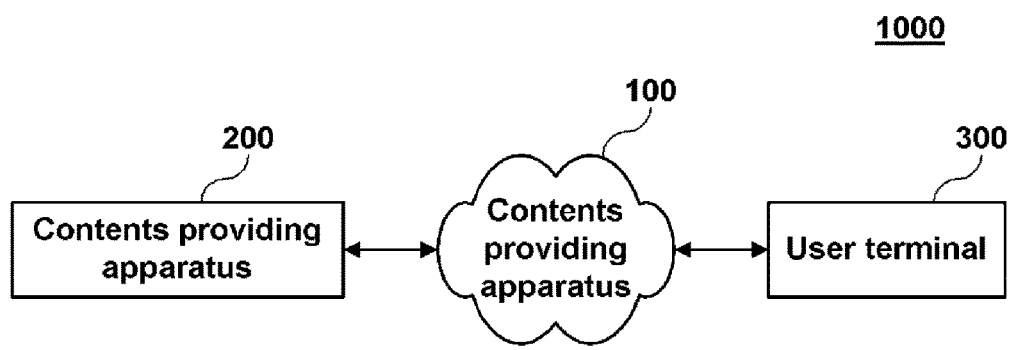
FIG. 1 is a view showing an embodiment of a multicast-based contents transmission system according to an aspect of the present invention.

Best Mode for Carrying Out the Invention

Reference will now be made in detail to embodiments of the present disclosure. While certain embodiments of the present disclosure will be described, it will be understood that it is not intended to limit the embodiments of the present disclosure to those described embodiments. To the contrary, reference to embodiments of the present disclosure is intended to cover alternatives, modifications, and equivalents as may be included within the spirit and scope of the embodiments of the present disclosure as defined by the appended claims.

Embodiments of a multicast-based contents transmission system, a contents providing apparatus, a user terminal, a multicast-based contents transmission method, a motion estimation apparatus for estimating a motion at a high speed, an image encoding apparatus and a motion estimation method will be described in detail with reference to the accompanying drawings. In describing with reference to the accompanying drawings, elements having like or corresponding functions will be denoted by like reference numerals and details thereon will not be repeated.

Multicast-based Contents Transmission System

FIG. 1 is a view showing an embodiment of a multicast-based contents transmission system according to an aspect of the present invention.

According to the embodiment, as shown in FIG. 1, the multicast-based contents transmission system 1000 may be configured to include a contents providing apparatus 200 and a user terminal 300 connected through a communication network 100.

The communication network 100 provides a transmission path for transmitting contents and a connection path for connecting the user terminal 300 and the contents providing apparatus 200.

For example, the communication network 100 includes mobile communication networks such as WCDMA, HDPA, 3F, 4G and the like, near field communication networks such as BlueTooth, ZigBee, WiFi and the like, and wired communication networks such as the Internet, PSTN and the like.

The contents providing apparatus 200 means a server which downloads or streams contents such as a movie, music, a moving image or the like to a client terminal and transmits the contents to a user terminal at a remote site through a wired or wireless communication network.

The contents providing apparatus 200 creates a plurality of multicast stream channels, transmits contents to a first user terminal after selecting one of the multicast stream channels, and transmits the contents to a second user terminal, a third user terminal and the like using other multicast stream channels.

From the viewpoint of the contents providing apparatus 200, the contents are simultaneously multicast to a plurality of user terminals.

The contents providing apparatus 200 creates N×M multicast stream channels respectively having a different transmission start time and a different transmission rate and provides an N×M multicast stream channel list to the user terminal 300.

The user terminal 300 inputs a channel selection signal for selecting a channel among the N×M multicast stream channels included in the provided list and transmits the channel selection signal to the contents providing apparatus 200, and the contents providing apparatus 200 transmits contents to the user terminal 300 using a multicast stream channel corresponding to the channel selection signal transmitted from the user terminal 200.

For example, the user terminal 300 may be a media device such as a set top box, an IPVT or the like, which means a terminal performing a client function, such as a PDA, a cellular phone, a smart phone, a tablet PC or the like.

Although a multicast stream channel is selected in the embodiment by transmitting first the N×M multicast stream channel list from the contents providing apparatus 200 and transmitting a channel selection signal from the user terminal 300 to the contents providing apparatus 200, the multicast stream channel may be selected by determining a user terminal and a multicast stream channel for transmitting contents and transferring information on the multicast stream channel to the user terminal by the contents providing apparatus 200.

Hereinafter, the configuration of the contents providing apparatus and the user terminal configuring the multicast-based contents transmission system will be described in detail.

Contents Providing Apparatus

Figure 2:
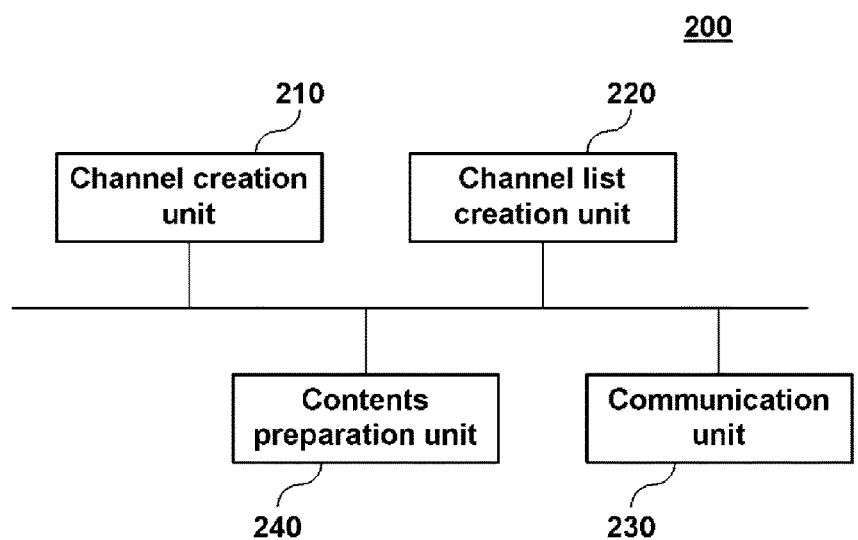
FIG. 2 is a view showing an embodiment of a contents providing apparatus according to another aspect of the present invention.

FIG. 2 is a view showing an embodiment of a contents providing apparatus according to another aspect of the present invention.

According to the embodiment, as shown in FIG. 2, the contents providing apparatus 200 may be configured to include a channel creation unit 210, a channel list creation unit 220 and a communication unit 230.

In addition, the contents providing apparatus 200 may further include a contents preparation unit 240.

The channel creation unit 210 creates multicast stream channels by dividing a transmission start time at regular intervals and creates a plurality of multicast stream channels respectively having a different transmission rate by dividing each of the channels divided by the transmission start time.

That is, the channel creation unit 210 creates N×M multicast stream channels configured of N multicast stream channels having transmission start times arranged at time intervals of T and M multicast stream channels of different transmission rates configured in each of the N multicast stream channels.

For example, if six multicast stream channels are created according to transmission start times by arranging the transmission start times at an interval of ten minutes and three multicast stream channels for transmitting data at three different transmission rates of $r_1$, $r_2$ and $r_3$ are created for each of the six multicast stream channels, eighteen multicast stream channels are created.

The channel list creation unit 220 creates an N×M multicast stream channel list including information on N×M multicast stream channels.

Here, the N×M multicast stream channel information includes information on the contents to be transmitted, a transmission start time and a transmission rate of each channel, and the user terminal may use the multicast stream channel information to confirm information on the state of each channel.

The communication unit 230 provides the N×M multicast stream channel list created by the channel list creation unit 220 and provides a transmission and reception interface for transmitting the contents through a channel among the N×M multicast stream channels created by the channel creation unit.

In addition, the channel preparation unit 240 creates the contents to be transmitted on the N×M multicast stream channels in the form of a packet.

User Terminal

Figure 3:
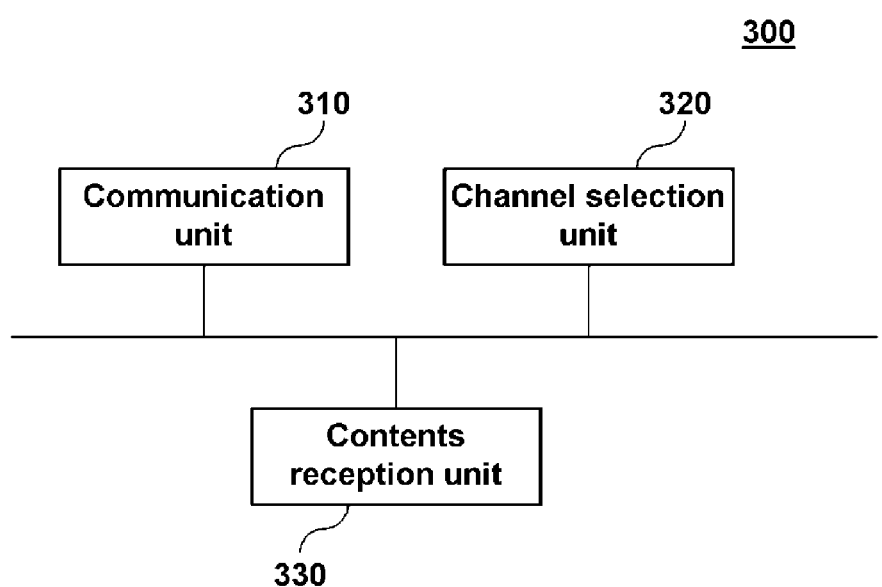
FIG. 3 is a view showing an embodiment of a user terminal according to another aspect of the present invention.

FIG. 3 is a view showing an embodiment of a user terminal according to another aspect of the present invention.

According to the embodiment, as shown in FIG. 3, the user terminal 300 may be configured to include a communication unit 310 and a channel selection unit 320 and may further include a contents reception unit 330.

The communication unit 310 means a connection path for receiving the N×M multicast stream channel list transmitted from the contents providing apparatus, transmitting a channel selection signal, and receiving contents through a multicast stream channel corresponding to the channel selection signal.

The channel selection unit 320 confirms an available transmission rate of a network and selects an available multicast stream channel from the N×M multicast stream channel list using the available transmission rate and a contents transmission request time.

The provided N×M multicast stream channel list includes multicast stream channel information configured of information on contents to be transmitted, a transmission start time and a transmission rate of each channel.

The user terminal 300 selects a multicast stream channel among the channels in the list considering the N×m multicast stream channel information, transmission request contents information input by a user and the network environment of the user terminal 300.

The channel selection unit 320 selects a candidate multicast stream channel primarily considering the network environment of the user terminal and selects a final multicast stream channel considering the transmission start time.

That is, the channel selection unit 320 selects a multicast stream channel having a transmission rate lower than an available transmission rate from the provided N×M multicast stream channel list as a candidate multicast stream channel, and selects a multicast stream channel having a transmission start time closest to the contents transmission request time in the N×M multicast stream channel list among the candidate multicast stream channels.

The contents reception unit 330 confirms loss of packets in the transmitted contents and restores the lost packets or request retransmission of the same contents if the packets cannot be restored.

Specifically, the contents reception unit 330 determines that the lost packets can be restored if the number of lost packets is smaller than a reference value and restores and stores the lost packets using a Forward Error Correction method or the like. Certain lost packet restoration methods other than the Forward Error Correction method may be used.

The contents reception unit 330 determines that the lost packets cannot be restored if the number of lost packets exceeds the reference value and requests retransmission of the contents after deleting packets of the transmitted contents.

If retransmission of the contents is requested, the channel selection unit 320 selects a candidate multicast stream channel list by comparing an available transmission rate, which is a network environment of the user terminal at the time of requesting retransmission of the contents, with transmission rates of the N×M multicast stream channel list and select a multicast stream channel by comparing a contents retransmission request time and a transmission start time.

That is, the channel selection unit 320 selects a multicast stream channel having a transmission rate lower than the available transmission rate of the network at the time of requesting retransmission of contents as a candidate multicast stream channel and selects a multicast stream channel having a transmission start time later than and, at the same time, closest to the contents transmission request time among the candidate multicast stream channels.

Since the available transmission rate of the network at the time of requesting retransmission of contents may be different from that of the initial contents transmission request and the contents transmission request time is also not the same, a channel should be selected using the available transmission rate and the contents transmission request time at the time point of generating a contents transmission request.

In addition, the channel selection unit 320 may select a multicast stream channel having a transmission start time later than the contents transmission request time in the N×M multicast stream channel list from the provided N×M multicast stream channel list as a candidate multicast stream channel, and select a multicast stream channel having a transmission rate lower than the available transmission rate of the network and, at the same time, highest among the candidate multicast stream channels.

The contents transmission time can be reduced if a multicast stream channel is selected through the method as described above.

Multicast-based Contents Transmission Method

FIGS. 4 to 8 are flowcharts illustrating first to fifth embodiments of a multicast-based contents transmission method according to another aspect of the present invention.

Figure 4:
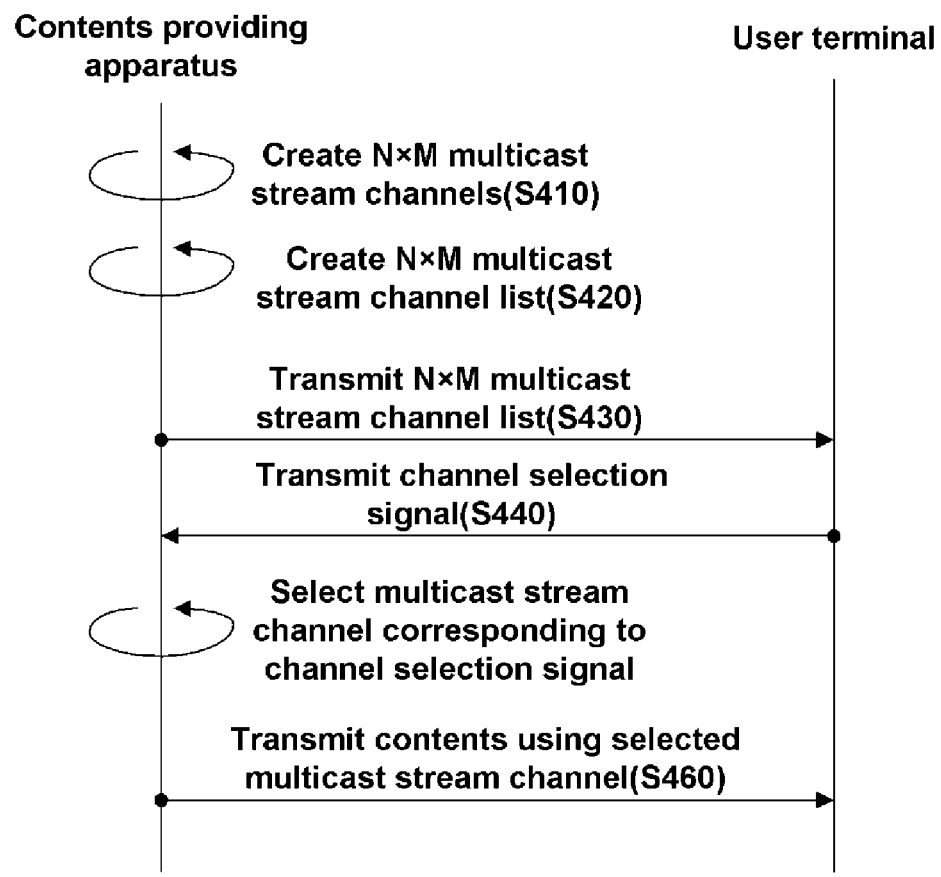
FIG. 4 is a flowchart illustrating a first embodiment of a multicast-based contents transmission method according to another aspect of the present invention.

As shown in FIG. 4, the multicast-based contents transmission method according to a first embodiment includes the steps of creating a channel between a multicast-based contents transmission apparatus and a user terminal, selecting a channel, and transmitting contents through the selected channel.

First, the contents providing apparatus creates N×M multicast stream channels S410 and creates a list including channel information on the created N×M multicast stream channels S420.

Here, the channel information includes information on contents to be transmitted, a transmission start time and a transmission rate.

Next, the contents providing apparatus transmits an N×M multicast stream channel list to the user terminal S430.

If the user terminal selects a specific channel and transmits a channel selection signal to the contents providing apparatus S440, the contents providing apparatus selects a multicast stream channel corresponding to the channel selection signal S450.

If a specific contents transmission channel between the contents providing apparatus and the user terminal is selected among a plurality of multicast stream channels, the contents providing apparatus transmits contents through the selected transmission channel S460.

Figure 5:
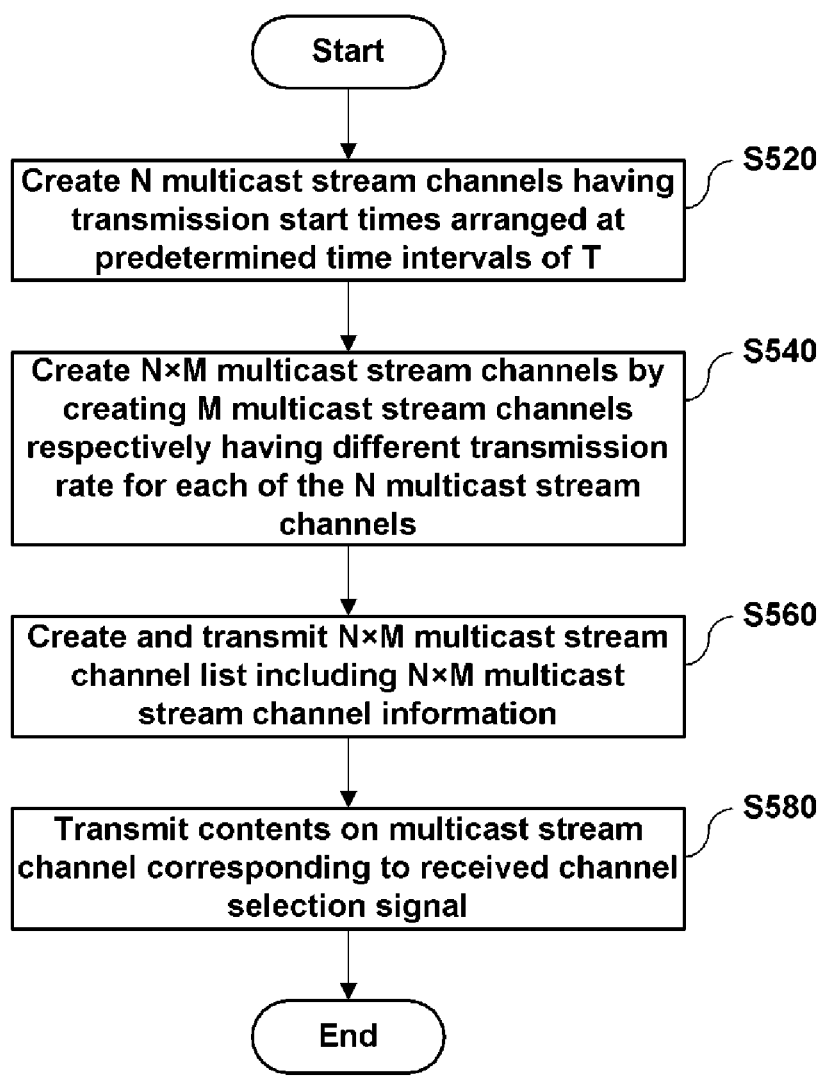
FIG. 5 is a flowchart illustrating a second embodiment of a multicast-based contents transmission method according to another aspect of the present invention.

As shown in FIG. 5, the multicast-based contents transmission method according to a second embodiment includes the steps of creating a plurality of channels by the multicast-based contents providing apparatus side, selecting a channel according to channel selection information, and transmitting contents through the selected channel.

First, the contents providing apparatus creates N multicast stream channels having transmission start times arranged at predetermined time intervals of T S520, creates M multicast stream channels respectively having a different transmission rate for each of the N multicast stream channels, and finally creates N×M multicast stream channels S540.

Next, the contents providing apparatus creates and transmits an N×M multicast stream channel list including information on each channel S560 and transmits contents through a multicast stream channel corresponding to the channel selection signal transmitted from outside S580.

Figure 6:
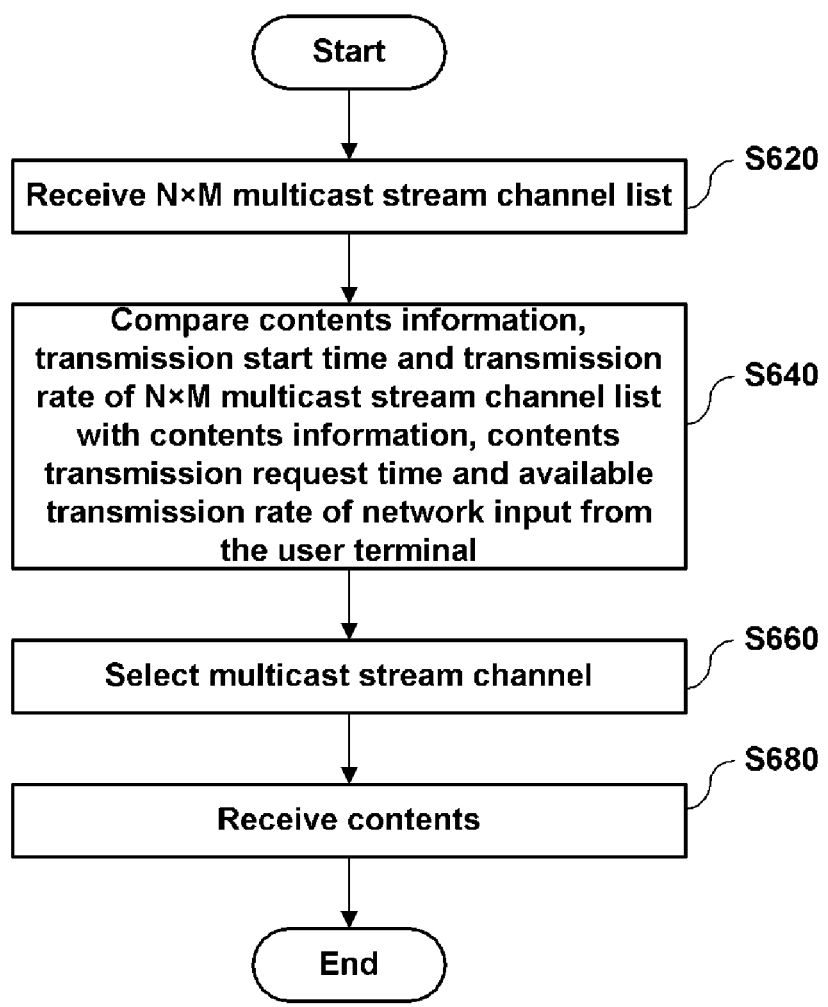
FIG. 6 is a flowchart illustrating a third embodiment of a multicast-based contents transmission method according to another aspect of the present invention.

As shown in FIG. 6, the multicast-based contents transmission method according to a third embodiment includes the steps of selecting a channel considering the channel information of the N×M multicast stream channel list transmitted from the user terminal side and the network environment of the user terminal, and receiving contents through the selected channel.

First, the user terminal receives the N×M multicast stream channel list including multicast stream channel information configured of contents information, a transmission start time and a transmission rate S620.

Next, the user terminal compares the transmission start time, the transmission rate and the contents information of the transmitted N×M multicast stream channel list with an available transmission rate of the network measured by the user terminal, a contents transmission request time and information on contents to be received S640.

The user terminal selects a multicast stream channel by comparing information on the channels included in the list with information on the user terminal S660 and receives contents through the selected channel S680.

At this point, the selected multicast stream channel may be changed according to the priority of the contents information, the transmission start time or the transmission rate.

First, a specific embodiment of a method of selecting a multicast stream channel according to a priority and whether or not to request retransmission of contents according to packet loss of the transmitted contents will be described with reference to FIGS. 7 and 8.

Figure 7:
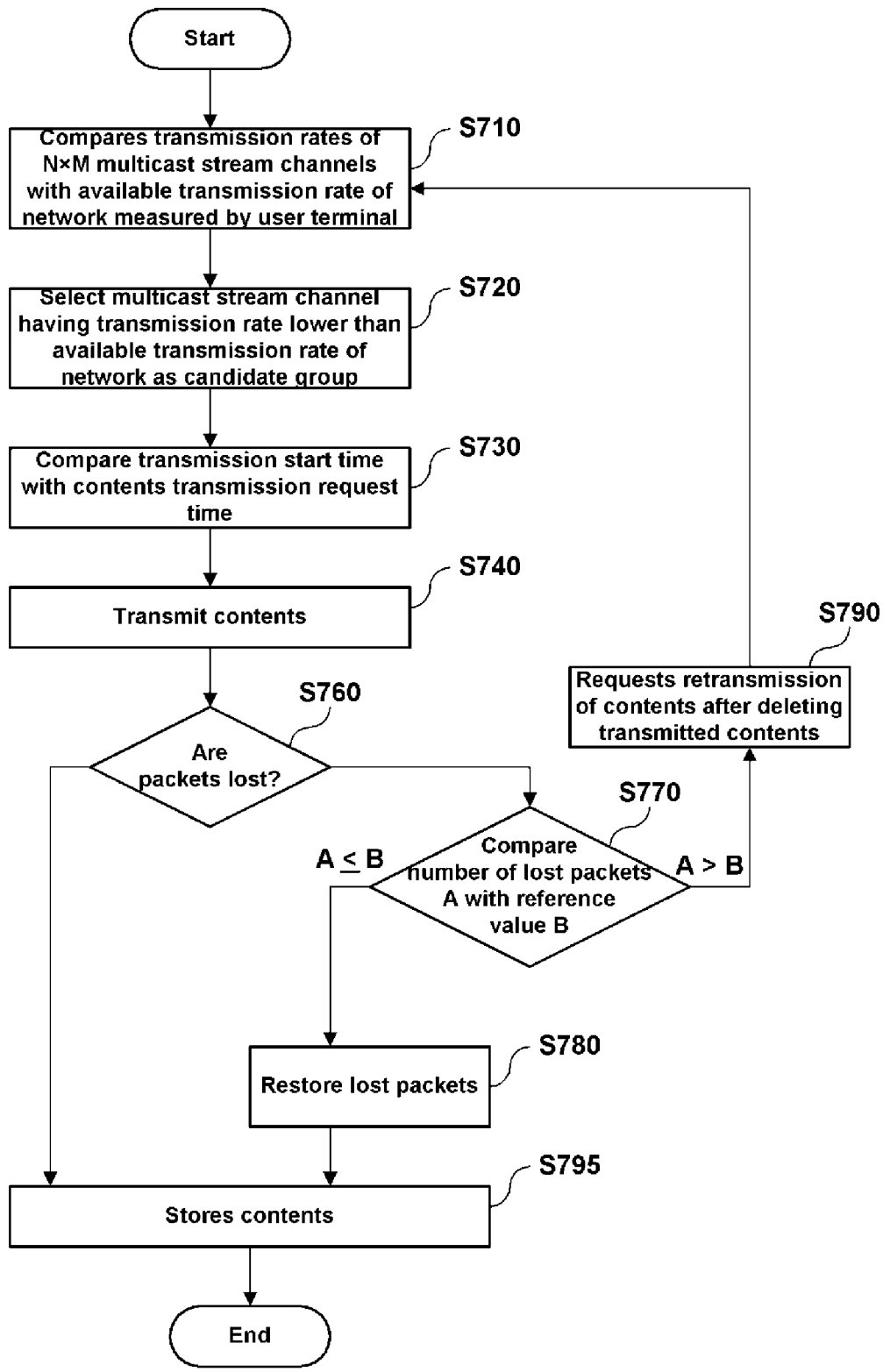
FIG. 7 is a flowchart illustrating a fourth embodiment of a multicast-based contents transmission method according to another aspect of the present invention.

As shown in FIG. 7, when the transmission rate is set as a first reference and the transmission start time is set as a second reference, the multicast-based contents transmission method according to a fourth embodiment includes the steps of selecting a multicast stream channel and storing contents or requesting retransmission of the contents according to packet loss of the transmitted contents.

First, the user terminal compares the transmission rate, which is the first reference, with the available transmission rate of the network measured by the user terminal for the N×M multicast stream channels S710 and selects multicast stream channels having a transmission rate lower than the available transmission rate of the network as a candidate group S720.

Next, the user terminal compares the transmission start time, which is the second reference, with the contents transmission request time of the user terminal for the candidate group S730 and selects a multicast stream channel having a transmission start time later than and closest to the contents transmission request time among the candidate group S740.

The user terminal provides a channel selection signal to the contents providing apparatus to select a multicast stream channel for transmitting contents between the user terminal and the contents providing apparatus and downloads the contents from the contents providing apparatus through the selected channel S750.

When transmission of the contents is completed, the user terminal examines packet loss of the transmitted contents S760, stores the contents if packet loss does not occur S795, and determines whether or not the lost packets can be restored if packet loss occurs.

The procedure of determining whether or not the lost packets can be restored compares the number of lost packets A with a reference value B S770, determines that the lost packets can be restored and restores the packets if the number of lost packets A is smaller than the reference value B S780, and determines that the lost packets cannot be restored and requests retransmission of the contents after deleting the transmitted contents if the number of lost packets A exceeds the reference value B S790.

If retransmission of contents is requested, the steps after S710 for selecting a channel based on the available transmission rate of the network and the contents retransmission request time of the user terminal at the time point of requesting retransmission of contents and transmitting the contents are repeatedly performed.

Figure 8:
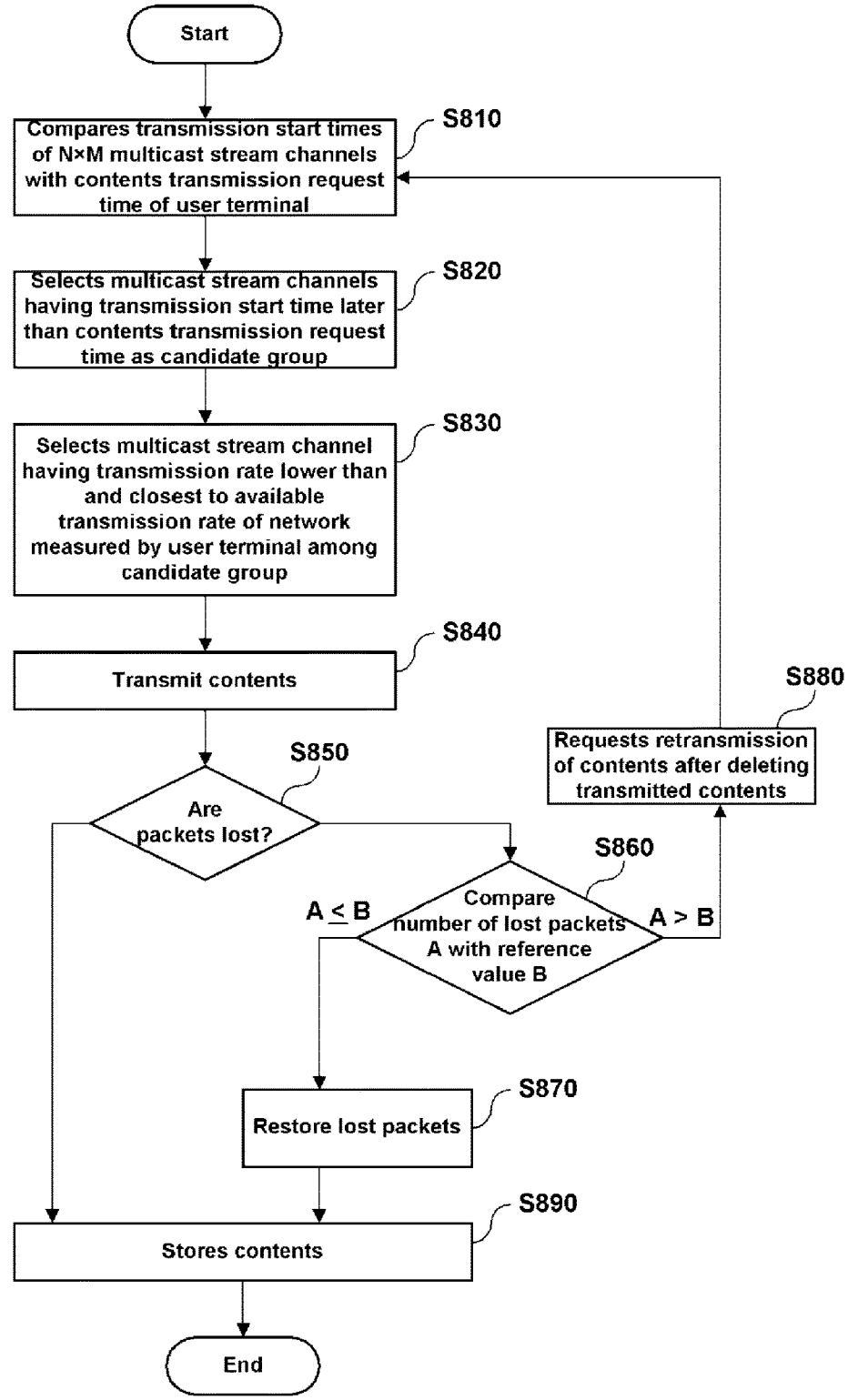
FIG. 8 is a flowchart illustrating a fifth embodiment of a multicast-based contents transmission method according to another aspect of the present invention.

As shown in FIG. 8, when the transmission start time is set as a first reference and the transmission rate is set as a second reference, the multicast-based contents transmission method according to a fifth embodiment includes the steps of selecting a multicast stream channel and storing contents or requesting retransmission of the contents according to whether or not the transmitted contents packets are lost.

First, the user terminal compares the transmission start time, which is the first reference, with the contents transmission request time of the user terminal for the N×M multicast stream channels S810 and selects multicast stream channels having a transmission start time later than the contents transmission request time as a candidate group S820.

Next, the user terminal selects a multicast stream channel having a transmission rate, which is the second reference, lower than and closest to the available transmission rate of the network among the multicast stream channels included in the candidate group S830.

The user terminal provides a channel selection signal to the contents providing apparatus to select a multicast stream channel for transmitting contents between the user terminal and the contents providing apparatus and downloads the contents from the contents providing apparatus through the selected channel S840.

When transmission of the contents is completed, the user terminal examines packet loss of the transmitted contents S850, stores the contents if packet loss does not occur S890, and determines whether or not the lost packets can be restored if packet loss occurs.

The procedure of determining whether or not the lost packets can be restored compares the number of lost packets A with a reference value B S860, determines that the lost packets can be restored and restores the packets if the number of lost packets A is smaller than the reference value B S870, and determines that the lost packets cannot be restored and requests retransmission of the contents after deleting the transmitted contents if the number of lost packets A exceeds the reference value B S880.

If retransmission of contents is requested, the steps after S810 for selecting a channel based on the available transmission rate of the network and the contents retransmission request time of the user terminal at the time point of requesting retransmission of contents and transmitting the contents are repeatedly performed.

Accordingly, the contents providing apparatus may create a plurality of multicast stream channels and multicast contents to a plurality of user terminals, and the user terminal may select a channel appropriate to the user terminal environment among the plurality of multicast stream channels and download contents.

Motion Estimation Apparatus

Figure 9:
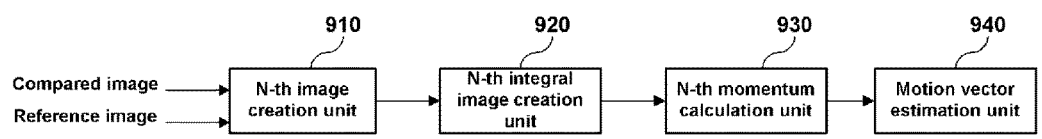
FIG. 9 is a view showing an embodiment of a motion estimation apparatus according to another aspect of the present invention.

FIG. 9 is a view showing an embodiment of a motion estimation apparatus according to another aspect of the present invention.

According to the embodiment, as shown in FIG. 9, the motion estimation apparatus is configured to include an n-th image creation unit 910, an n-th integral image creation unit 920, an n-th momentum calculation unit 930 and a motion vector estimation unit 940.

The motion estimation apparatus according to the present invention may reduce operation quantity and improve the speed of estimation when a motion between a compared image and a reference image is estimated by creating an n-th image and an n-th integral image and calculating an n-th momentum using them.

The n-th image creation unit 910 creates an n-th compared image and an n-th reference image having a value obtained by multiplying a pixel value by n times as an n-th pixel value of a pixel for each pixel of the compared image and the reference image.

Here, the compared image means a current image for estimating or encoding a motion, and the reference image means a previous image on the time axis or a previously encoded image.

The n-th image creation unit 910 creates the n-th compared image and the n-th reference image using the following [Mathematical expression 1].

Mathematical Expression 1

$$O_n(x,y)=i(x,y)*O_{n-1}(x,y) \quad \text{[Equation 1]}$$

Here, $i(x,y)$ expresses an original image of a compared image or a reference image, $O_n(x,y)$ expresses an n-th compared image or an n-th reference image, and $(x,y)$ expresses pixel coordinates.

The n-th integral image creation unit 920 creates an n-th integral compared image and an n-th integral reference image by calculating pixel values up to set pixel coordinates for the n-th compared image and the n-th reference image.

For example, if the pixel value of a first image is x, the pixel value of a second image becomes $x^2$, and the pixel value of a third image becomes $x^3$.

The n-th integral image creation unit 920 creates the n-th integral compared image and the n-th integral reference image using the following [Mathematical expression 2].

Mathematical Expression 2

$$I_n(X,Y)=\Sigma^Y \Sigma^X O_n(x,y) \quad \text{[Equation 2]}$$

Here, $I_n(x,y)$ expresses an n-th integral compared image or an n-th integral reference image, $O_n(x,y)$ expresses an n-th compared image or an n-th reference image, and $(x,y)$ expresses pixel coordinates.

For example, $I_n(2, 3)$ is a value integrating $O_n(1, 1)$, $O_n(2, 1)$, $O_n(2, 2)$ and $O_n(2, 3)$. That is, the n-th integral image $I_n(2, 3)$ of coordinates $(2,3)$ is a value integrating an n-th image pixel value of coordinates $(1,1)$, an n-th image pixel value of coordinates $(2,1)$, an n-th image pixel value of coordinates $(2,2)$ and an n-th image pixel value of coordinates $(2,3)$.

The n-th momentum calculation unit 930 calculates an n-th momentum of the compared image and an n-th momentum of the reference image for a set block using the n-th integral compared image and the n-th integral reference image.

The n-th momentum calculation unit 930 calculates an n-th momentum of four blocks including a set block for the compared image and the reference image using the following [Mathematical expression 3].

Mathematical Expression 3

$$M_n=I_n(x_e,y_e)+I_n(x_e-1,y_e-1)[I_n(x_e-1,y_e)+I_n(x_e,y_e-1)] \quad \text{[Equation 3]}$$

Here, $I_n(x, y)$ expresses an n-th integral compared image or an n-th integral reference image of a pixel or a block $(x_e, y_e)$, and $(x_e, y_e)$, $(x_e-1, y_e-1)$, $(x_e-1, y_e)$ and $(x_e, y_e-1)$ express the pixel coordinates or block coordinates.

The motion vector estimation unit 940 calculates a block matching error using a difference between the n-th momentum of the compared image and the n-th momentum of the reference image and estimates a coordinate difference between a compared image block and a reference image block having a smallest block matching error as a motion vector.

The motion vector estimation unit 940 calculates at least one of SAD and SSD as a block matching error using the following [Mathematical expression 4].

Mathematical Expression 4

$$SAD = [\Sigma \alpha_n |M_{n,ref} - M_{n,curr}|] \times \gamma$$

$$SSD = [\Sigma \beta_n |M_{n,ref} - M_{n,curr}|^2] \times \gamma \quad \text{[Equation 4]}$$

Here, $M_{n,ref}$ denotes an n-th momentum for a set block of the reference image, $M_{n,curr}$ denotes an n-th momentum for a set block of the compared image, $\alpha_n$ and $\beta_n$ denote weighting factors of the n-th momentums, and $\gamma$ denotes a constant.

Accuracy and operation quantity of the calculation increase as the n value increases, and the accuracy and operation quantity of the calculation decrease as the n value decreases.

Figure 11:
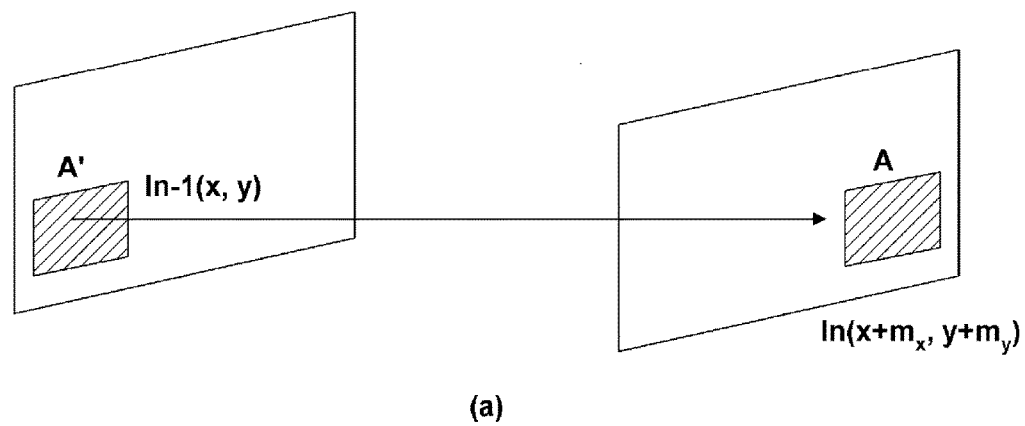
FIG. 11 is a view illustrating a method of calculating a motion estimation vector and an n-th momentum according to another aspect of the present invention.
Figure 11:
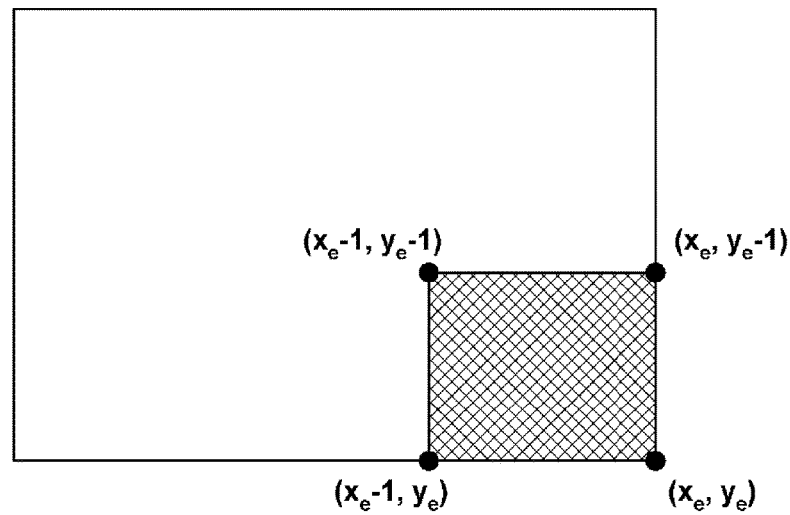

FIG. 11 is a view illustrating a method of calculating a motion estimation vector and an n-th momentum according to another aspect of the present invention.

According to the embodiment, as shown in FIG. 11(a), block A' of the reference image matches to block A of the compared image, and a motion of $(m_x, m_y)$ may be estimated.

In addition, as shown in FIG. 11(b), the n-th momentum may be calculated using an n-th integral image of four blocks (or coordinates) including a set block (or coordinates) for the compared image and the reference image. As a result, the n-th momentum means a pixel value of the n-th integral image of the shaded area.

Image Encoding Apparatus

Figure 10:
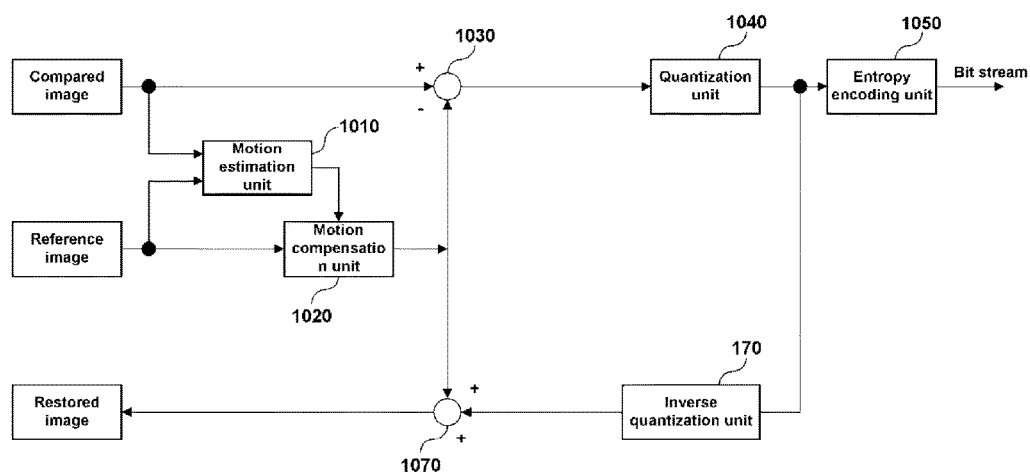
FIG. 10 is a view showing an embodiment of an image encoding apparatus according to another aspect of the present invention.

FIG. 10 is a view showing an embodiment of an image encoding apparatus according to another aspect of the present invention.

According to the embodiment, as shown in FIG. 10, the image encoding apparatus is configured to include a motion estimation unit 1010, a motion compensation unit 1020, a subtractor 1030, a quantization unit 1040, an entropy encoding unit 1050, an inverse quantization unit 1060, and an adder 1070.

The motion estimation unit 1010 selects a block having a smallest block matching error as a matching block by comparing the compared image and the reference image by the unit of block and calculates a motion vector using a coordinate difference between the blocks.

Here, the compared image means a current image for estimating or encoding a motion, and the reference image means a previous image on the time axis or a previously encoded image.

The motion estimation unit 1010 of the image encoding apparatus for estimating a motion at a high speed creates an n-th compared image and an n-th reference image for a compared image and a reference image, creates an n-th integral compared image and an n-th integral reference image by calculating pixel values up to set pixel coordinates for the n-th compared image and the n-th reference image, calculates an n-th momentum of the compared image and an n-th momentum of the reference image for a set block using the n-th integral compared image and the n-th integral reference image, calculates a block matching error using an n-th momentum difference, and estimates a coordinate difference between a compared image block and a reference image block having a smallest block matching error as a motion vector. For detailed information, see the descriptions of FIG. 9.

The motion compensation unit 1020 creates an estimated image for the compared image from the reference image using the estimated motion vector, and the subtractor 1030 creates a difference image of the compared image and the reference image.

The encoding unit 1050 encodes the created difference image.

Here, a frequency space conversion unit and the quantization unit 1040 may be further included between the subtractor 1030 and the encoding unit 1050.

The frequency space conversion unit converts a difference between the compared image and the estimated image created by the subtractor 1030 from a color space into a frequency space using a method such as Discrete Hadamard Transformation (DHT), Discrete Cosine Transformation (DCT) or the like, and the quantization unit 1040 quantizes the values converted by the frequency space conversion unit.

The encoding unit 1050 creates a bit stream by encoding the values quantized by the quantization unit in an encoding method such as Context-Adaptive Variable Length Coding (CAVLC), Context-Adaptive Binary Arithmetic Coding (CABAC) or the like.

The inverse quantization unit 1060 restores frequency component values by multiplying the quantized values by a quantization parameter, and the adder 1070 creates a restored image by adding a difference between the estimated image and the restored image created by the motion compensation unit 1020.

Motion Estimation Method

Figure 12:
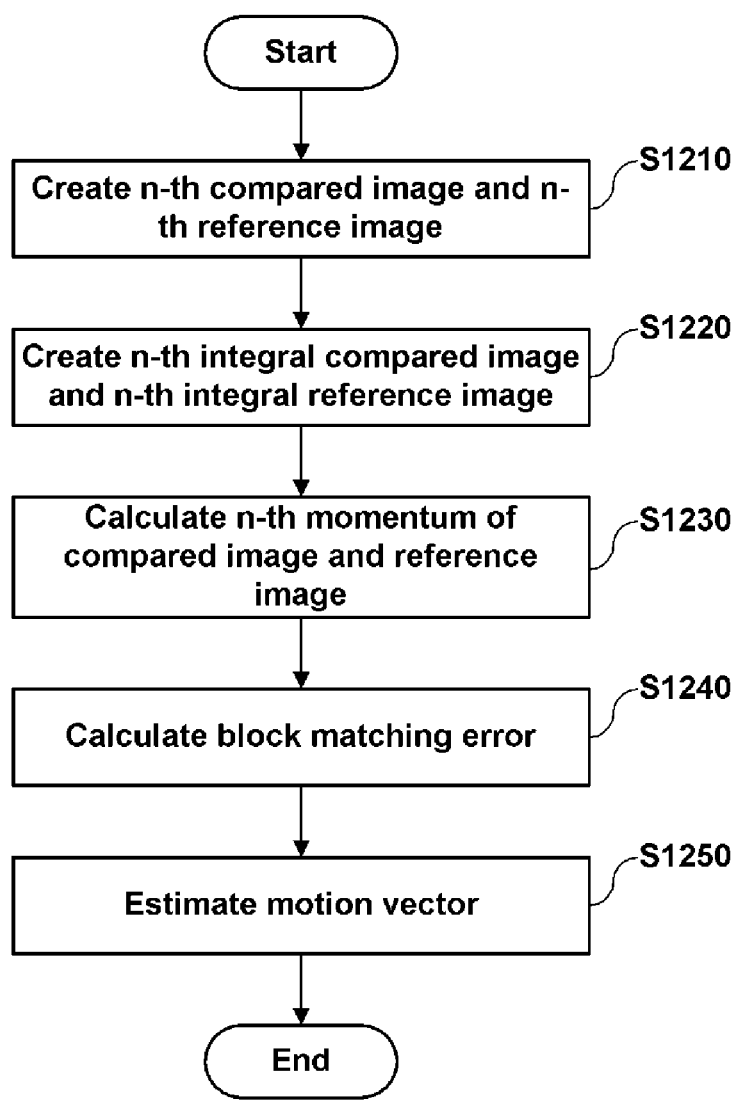
FIG. 12 is a flowchart illustrating an embodiment of a motion estimation method according to another aspect of the present invention.

FIG. 12 is a flowchart illustrating an embodiment of a motion estimation method according to another aspect of the present invention.

According to the embodiment, as shown in FIG. 12, an n-th image and an n-th integral image are sequentially created S1210 and S1220, and an n-th momentum is created using the n-th integral image S1230. Then, a block matching error is calculated S1240, and a motion vector is estimated by matching a block having a smallest block matching error S1250.

Creating an n-th image S1210 is creating an n-th compared image and an n-th reference image having a value obtained by multiplying a pixel value by n times as an n-th pixel value of a pixel for each pixel of the compared image and the reference image.

Creating an n-th integral image S1220 is creating an n-th integral compared image and an n-th integral reference image by integrating pixel values up to set pixel coordinates for the n-th compared image and the n-th reference image.

Calculating an n-th momentum S1230 is calculating an n-th momentum of the compared image and an n-th momentum of the reference image for a set block using the n-th integral compared image and the n-th integral reference image.

Estimating a motion vector S1250 is extracting a block having a smallest absolute value of a difference between the n-th momentum of the compared image and the n-th momentum of the reference value from the compared image and the reference image and determining a coordinate difference of the extracted blocks as a motion vector.

According to the present invention, since the created n-th image and n-th integral image of the current image (compared image) and the calculated n-th momentum and block matching error may be utilized as a reference image for estimating a motion of a next image, motions may be estimated at a high speed.

Particularly, if n-th integral images of the compared image and the reference image are created, the same n-th integral images may be used to calculate a motion vector of all blocks included in each image, and thus (2N×N−1) times of operations are needed in the prior art to compare a block having an N×N size. However, according to the present invention, the number of operations can be reduced to (5*n−1) times.

Since N which is generally used in H.264 is 8, 127 times of operations of the prior art may be reduced to 9 times (n=2), 14 times (n=3) or the like, and thus the speed can be improved by 9 to 14 times.

INDUSTRIAL APPLICABILITY

In the field of transmitting and receiving contents, the present invention can be applied to an apparatus and system for multicasting the contents to a plurality of clients, a recording medium for recoding the above-mentioned method, and an apparatus executing an application program, considering network use cost required when the contents are transmitted.

In addition, in the field of encoding or encoding and transmitting an image, the present invention can be applied to an apparatus and system capable of reducing operation quantity required for block matching and encoding the image at a high speed, a recording medium for recoding the above-mentioned method, and an apparatus executing an application program.

The invention claimed is:

1. A user terminal comprising:
a memory;
a processor configured to execute instructions stored in the memory and to:
receive an N×M multicast stream channel list having the N×M multicast stream channels configured of N multicast stream channels having transmission start times arranged at time intervals of T and M multicast stream channels of different transmission rates configured in each of the N multicast stream channels;
transmit a channel selection signal for selecting a multicast stream channel from the N×M multicast stream channel list;
receive contents through a multicast stream channel corresponding to the channel selection signal;
select an available multicast stream channel from the N×M multicast stream channel list;
confirm loss of packets in the transmitted contents;
compare a number of lost packets of the transmitted contents with a reference value; and
restore the lost packets using a Forward Error Correction method.

2. The user terminal according to claim 1, wherein the N×M multicast stream channel list includes multicast stream channel information configured of information on contents to be transmitted, a transmission start time and a transmission rate of each channel.

3. The user terminal according to claim 2, wherein the processor is configured to:
select a multicast stream channel having a transmission rate lower than the available transmission rate from the provided N×M multicast stream channel list as a candidate multicast stream channel; and
select a multicast stream channel having a transmission start time closest to the contents transmission request time in the N×M multicast stream channel list among the candidate multicast stream channels.

4. The user terminal according to claim 2, wherein, when retransmission of the contents is requested, the processor is configured to:
select a candidate multicast stream channel list by comparing an available transmission rate of the user terminal at the time of requesting retransmission of the contents with transmission rates of the N×M multicast stream channel list; and
select a multicast stream channel by comparing a contents retransmission request time with the transmission start time.

5. The user terminal according to claim 2, wherein the processor is configured to:
select a multicast stream channel having a transmission start time later than the contents transmission request time in the N×M multicast stream channel list from the provided N×M multicast stream channel list as a candidate multicast stream channel; and
select a multicast stream channel having a transmission rate lower than the available transmission rate and highest among the candidate multicast stream channels.

6. A multicast-based contents reception method of a user terminal, the method comprising the steps of:
(a) receiving, by the user terminal, an N×M multicast stream channel list having the N×M multicast stream channels configured of N multicast stream channels having transmission start times arranged at time intervals of T and M multicast stream channels of different transmission rates configured in each of the N multicast stream channels, wherein the N×M multicast stream channel list including information on multicast stream channels configured of contents information, a transmission start time and a transmission rate;
(b) selecting, by the user terminal, a multicast stream channel by comparing the transmission start time, the transmission rate and the contents information of the transmitted N×M multicast stream channel list with an available transmission rate of a network measured by the user terminal, a contents transmission request time and information on contents to be received;
(c) transmitting, by the user terminal, a channel selection signal for selecting the multicast stream channel;
(d) receiving, by the user terminal, contents using the selected multicast stream channel;
(e) confirming loss of packets in the transmitted contents;
(f-1) comparing a number of lost packets of the transmitted contents with a reference value;
(f-2) restoring the lost packets using a Forward Error Correction method; and
(g) requesting retransmission of the same contents when the lost packets are not restored.

7. The method according to claim 6, wherein step (b) includes the steps of:
(b-1) selecting a multicast stream channel having a transmission rate lower than the available transmission rate from the transmitted N×M multicast stream channel list as a candidate multicast stream channel; and
(b-2) selecting a multicast stream channel having a transmission start time closest to the contents transmission request time in the N×M multicast stream channel list among the candidate multicast stream channels.

8. The method according to claim 6, wherein step (b) includes the steps of:
(b-1) selecting a multicast stream channel having a transmission start time later than the contents transmission request time in the N×M multicast stream channel list from the transmitted N×M multicast stream channel list as a candidate multicast stream channel; and
(b-2) selecting a multicast stream channel having a highest transmission rate among the candidate multicast stream channels.

9. A multicast-based contents reception method of a user terminal, the method comprising the steps of:
   (a) receiving, by the user terminal, an N×M multicast stream channel list having the N×M multicast stream channels configured of N multicast stream channels having transmission start times arranged at time intervals of T and M multicast stream channels of different transmission rates configured in each of the N multicast stream channels, wherein the N×M multicast stream channel list including information on multicast stream channels configured of contents information, a transmission start time and a transmission rate;
   (b) selecting, by the user terminal, a multicast stream channel by comparing the transmission start time, the transmission rate and the contents information of the transmitted N×M multicast stream channel list with an available transmission rate of a network measured by the user terminal, a contents transmission request time and information on contents to be received;
   (c) transmitting, by the user terminal, a channel selection signal for selecting the multicast stream channel;
   (d) receiving, by the user terminal, contents using the selected multicast stream channel; and
   (e) comparing, by the user terminal, the number of lost packets of the transmitted contents with a reference value for restoring the lost packets using a Forward Error Correction method.

10. A user terminal comprising:
   a memory;
   a processor configured to execute instructions stored in the memory and to:
      receive an N×M multicast stream channel list having the N×M multicast stream channels configured of N multicast stream channels having transmission start times arranged at time intervals of T and M multicast stream channels of different transmission rates configured in each of the N multicast stream channels;
      transmit a channel selection signal for selecting a multicast stream channel from the N×M multicast stream channel list;
      receive contents through a multicast stream channel corresponding to the channel selection signal;
   select an available multicast stream channel from the N×M multicast stream channel list;
      restore and store lost packets using a Forward Error Correction method when the number of lost packets is smaller than a reference value; and
      request retransmission of the contents after deleting packets of the transmitted contents when the number of lost packets exceeds the reference value.

\* \* \* \* \*